(12) United States Patent
Abraham et al.

(10) Patent No.: US 9,226,231 B2
(45) Date of Patent: Dec. 29, 2015

(54) SYSTEMS AND METHODS FOR MONITORING THE SIZE OF A WIRELESS NETWORK

(71) Applicant: QUALCOMM Incorporated, San Diego, CA (US)

(72) Inventors: Santosh Paul Abraham, San Diego, CA (US); Ashwin Swaminathan, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/161,556

(22) Filed: Jan. 22, 2014

(65) Prior Publication Data

US 2014/0211659 A1 Jul. 31, 2014

Related U.S. Application Data

(60) Provisional application No. 61/842,328, filed on Jul. 2, 2013, provisional application No. 61/824,907, filed on May 17, 2013, provisional application No. 61/762,246, filed on Feb. 7, 2013, provisional application No. 61/758,577, filed on Jan. 30, 2013.

(51) Int. Cl.
*H04W 52/02* (2009.01)
*H04W 8/00* (2009.01)
*H04L 12/751* (2013.01)

(52) U.S. Cl.
CPC .......... *H04W 52/0209* (2013.01); *H04W 8/005* (2013.01); *H04L 45/02* (2013.01)

(58) Field of Classification Search
None
See application file for complete search history.

(56) References Cited

U.S. PATENT DOCUMENTS

| 8,134,934 | B2 |  | 3/2012 | Chen et al. |
| 8,406,132 | B2 | * | 3/2013 | Cao ..................... H04L 12/2602 370/231 |
| 8,472,983 | B1 |  | 6/2013 | Kapoor et al. |
| 8,520,704 | B2 |  | 8/2013 | Li et al. |
| 8,953,472 | B2 | * | 2/2015 | Di Pietro ................ H04L 41/16 370/252 |
| 9,071,533 | B2 | * | 6/2015 | Hui ......................... H04L 45/16 |
| 2003/0026268 | A1 | * | 2/2003 | Navas ............... H04L 29/12009 370/400 |
| 2003/0126122 | A1 | * | 7/2003 | Bosley .............. G06F 17/30094 |
| 2007/0274324 | A1 | * | 11/2007 | Wu ....................... H04L 1/0076 370/400 |
| 2008/0002599 | A1 |  | 1/2008 | Yau et al. |

(Continued)

OTHER PUBLICATIONS

International Search Report and Written Opinion—PCT/US2014/012803—ISA/EPO—Jun. 3, 2014.

(Continued)

*Primary Examiner* — Candal Elpenord
(74) *Attorney, Agent, or Firm* — Knobbe Martens Olson & Bear LLP

(57) ABSTRACT

Systems and methods for monitoring the number of neighboring wireless devices in a wireless network are described herein. In one aspect, the method includes receiving a message from one of the neighboring wireless devices having an identifier associated with the neighboring wireless device and adding the identifier into a Bloom filter. The method may further include estimating the number of distinct strings that have been added into the Bloom filter based on the number of zeros in the Bloom filter, the number of distinct strings representing an estimate of the number of neighboring wireless devices in the wireless network.

28 Claims, 9 Drawing Sheets

(56) References Cited

U.S. PATENT DOCUMENTS

| | | |
|---|---|---|
| 2009/0016250 A1 | 1/2009 | Li et al. |
| 2009/0016255 A1 | 1/2009 | Park |
| 2012/0084459 A1 | 4/2012 | Wu et al. |
| 2013/0031367 A1 | 1/2013 | Mao et al. |
| 2014/0032714 A1* | 1/2014 | Liu .................. H04L 67/18 709/217 |

OTHER PUBLICATIONS

Tong B., et al., "A three-tier framework for intruder information sharing in sensor networks" . . . , Ad Hoc Networks, Elsevier, Amsterdam, NL, vol. 8, No. 3, May 1, 2010, pp. 345-360, XP026823995, ISSN: 1570-8705.

Zhang M., et al., "Connectivity Monitoring in Wireless Sensor Networks", Pervasive and Mobile Computing, Elsevier, NL, vol. 6, No. 1, Feb. 1, 2010, pp. 112-127, XP026877879, ISSN: 1574-1192.

* cited by examiner

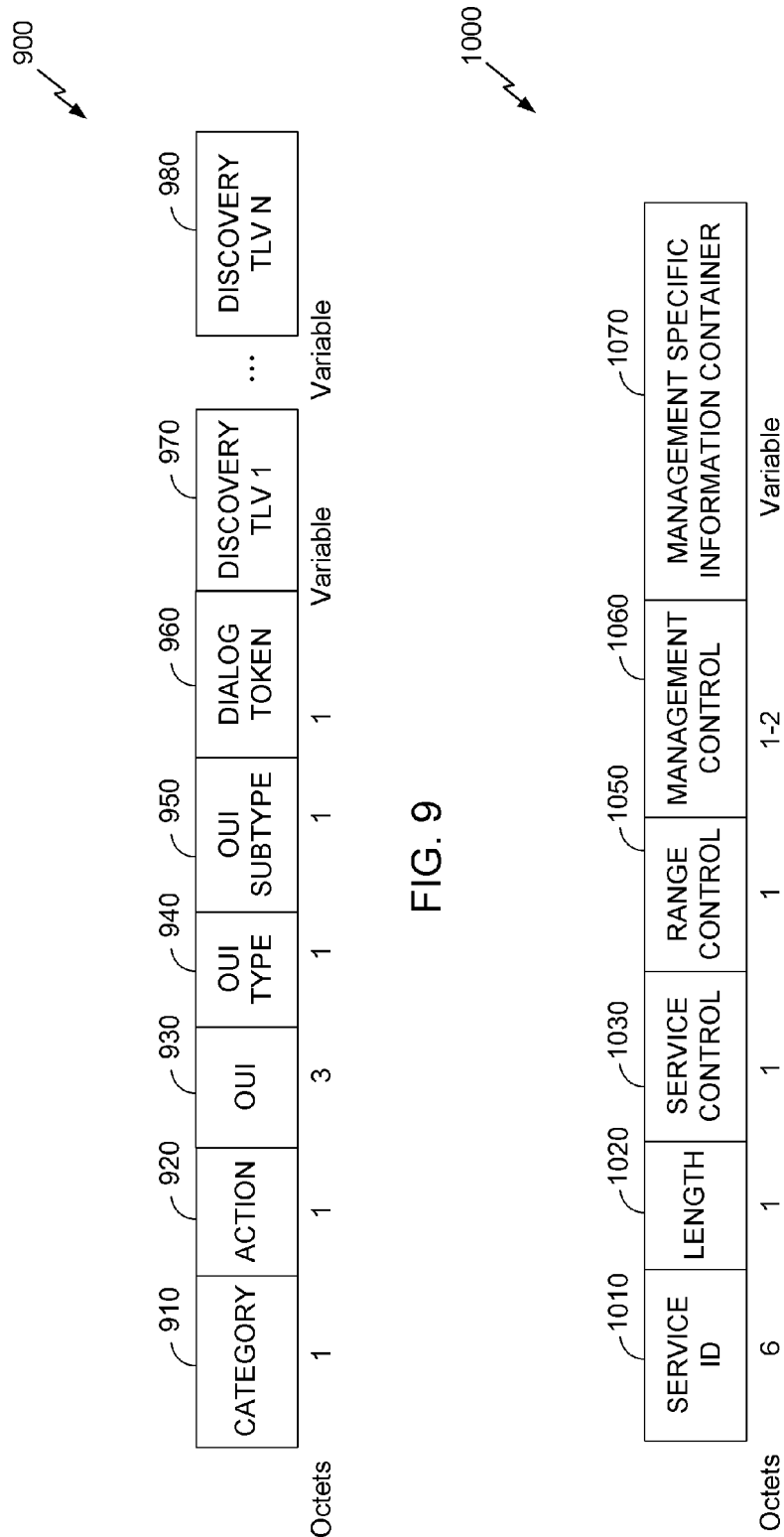

SYSTEMS AND METHODS FOR MONITORING THE SIZE OF A WIRELESS NETWORK

CLAIM OF PRIORITY UNDER 35 U.S.C. §119

The present application for patent claims priority to Provisional Application No. 61/758,577 entitled "SYSTEMS AND METHODS FOR MONITORING THE SIZE OF A WIRELESS NETWORK" filed Jan. 30, 2013, and assigned to the assignee hereof and hereby expressly incorporated by reference herein. The present application for patent further claims priority to Provisional Application No. 61/762,246 entitled "SYSTEMS AND METHODS FOR MONITORING THE SIZE OF A WIRELESS NETWORK" filed Feb. 7, 2013, and assigned to the assignee hereof and hereby expressly incorporated by reference herein. The present application for patent further claims priority to Provisional Application No. 61/824,907 entitled "SYSTEMS AND METHODS FOR MONITORING THE SIZE OF A WIRELESS NETWORK" filed May 17, 2013, and assigned to the assignee hereof and hereby expressly incorporated by reference herein. The present application for patent further claims priority to Provisional Application No. 61/842,328 entitled "SYSTEMS AND METHODS FOR MONITORING THE SIZE OF A WIRELESS NETWORK" filed Jul. 2, 2013, and assigned to the assignee hereof and hereby expressly incorporated by reference herein.

BACKGROUND

1. Field

The present application relates generally to wireless communications, and more specifically to systems, methods, and devices for monitoring the size of a wireless network.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. The information can include packets, which in some aspects can be referred to as data units. The packets can include overhead information (e.g., header information, packet properties, etc.) that helps in routing the packets through the network, identifying the data in the packets, processing the packets, etc. The packets can further include data, such as user data, multimedia content, etc. that can be carried in a payload of the packet.

To ensure scalable operation in a wireless network such as a social-WiFi network, transmissions by each device in the network should be controlled based on the number of devices in the network. For example, it may be desirable to adjust the rate at which beacons and/or timing signals are transmitted based on the number of devices in the network. In many applications, it is sufficient to obtain a rough estimate of the number of devices in the network. One way for a wireless device to track the number of devices in the network is to simply store any identifier received in a message and representing a device. Whenever a new message comes in, the device will compare the identifier in the new message to identifiers already stored at the device and store the identifier if it has not been previously stored. However, this approach can lead to large memory requirements and needs for sorting a larger number of received identifiers. Thus it is beneficial to have a method of tracking the number of devices in a wireless network, which can largely reduce the larger memory requirements and the needs for sorting the identifiers.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," one of ordinary skill in the art will appreciate how advantageous features of this invention include reduced power consumption when introducing devices on a medium.

One aspect of the disclosure provides a wireless device configured to monitor the number of neighboring wireless devices in a wireless network. The wireless device includes a receiver configured to receive a message from one of the neighboring wireless devices, the message comprising an identifier associated with the neighboring wireless device. The wireless device may further include a processor configured to add the identifier into a Bloom filter and to estimate the number of distinct strings that have been added into the Bloom filter based on the number of zeros in the Bloom filter, the number of distinct strings representing an estimate of the number of neighboring wireless devices in the wireless network.

Another aspect of the disclosure provides a method of monitoring the number of neighboring wireless devices in a wireless network. The method includes receiving a message from one of the neighboring wireless devices comprising an identifier associated with the neighboring wireless device and adding the identifier into a Bloom filter. The method may further include estimating the number of distinct strings that have been added into the Bloom filter based on the number of zeros in the Bloom filter, the number of distinct strings representing an estimate of the number of neighboring wireless devices in the wireless network.

Another aspect of the disclosure provides a wireless device for monitoring the number of neighboring wireless devices in a wireless network. The wireless device includes means for receiving a message from one of the neighboring wireless devices comprising an identifier associated with the neighboring wireless device and means for adding the identifier into a Bloom filter. The wireless device may further include means for estimating the number of distinct strings that have been added into the Bloom filter based on the number of zeros in the Bloom filter, the number of distinct strings representing an estimate of the number of neighboring wireless devices in the wireless network.

Another aspect of the disclosure provides non-transitory physical computer storage comprising computer executable instructions configured to implement a method for monitoring the number of neighboring wireless devices in a wireless network. The method includes receiving a message from one of the neighboring wireless devices comprising an identifier associated with the neighboring wireless device and adding the identifier into a Bloom filter. The method may further include estimating the number of distinct strings that have been added into the Bloom filter based on the number of zeros in the Bloom filter, the number of distinct strings representing an estimate of the number of neighboring wireless devices in the wireless network.

BRIEF DESCRIPTION OF THE DRAWINGS

FIG. 9 illustrates an example vendor-specific discovery frame.

FIG. 10 shows a discovery type length value (TLV) that may be employed within the wireless communication system of FIG. 1.

DETAILED DESCRIPTION

Figure 1:
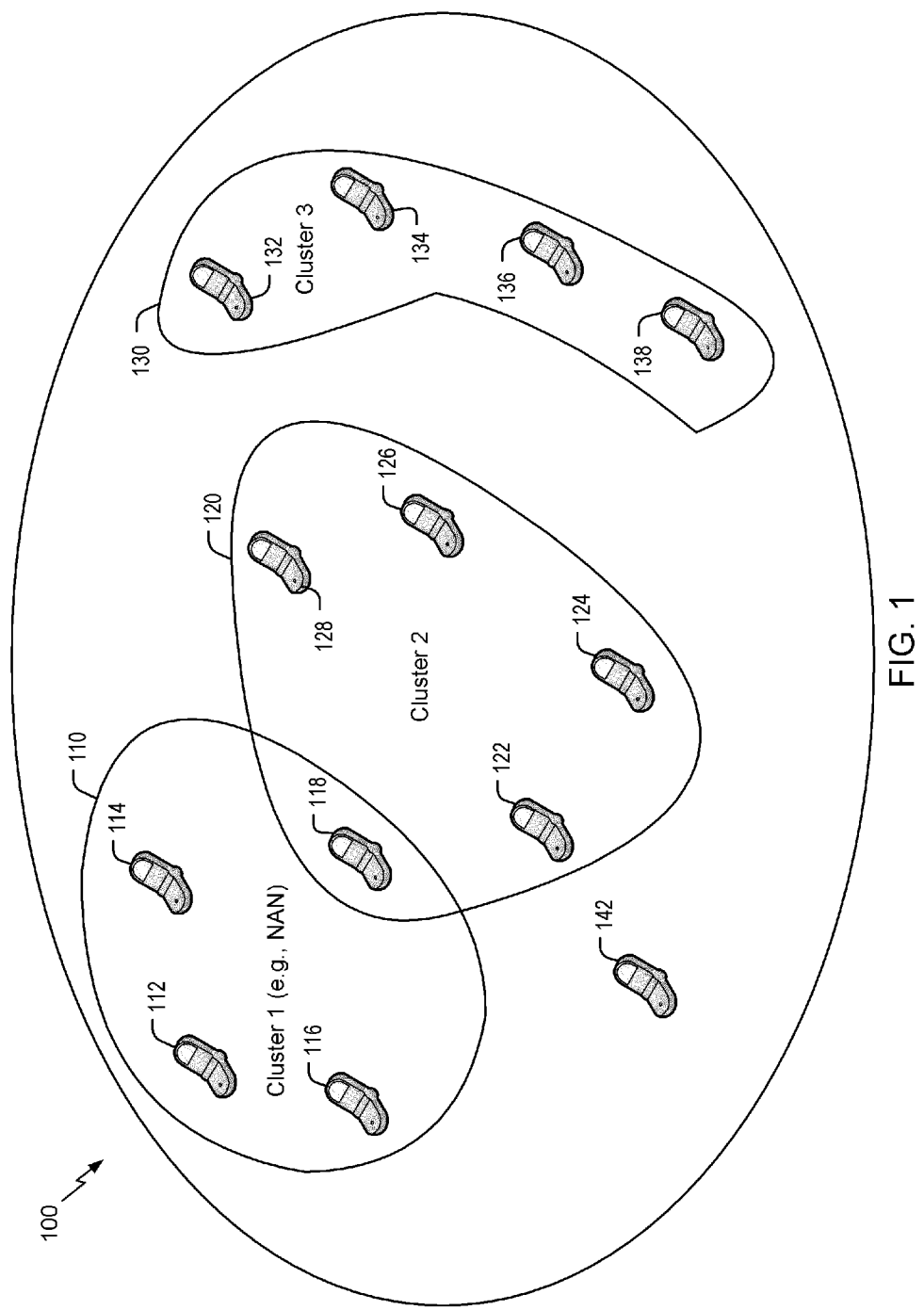
FIG. 1 illustrates an example of a wireless communication system in which aspects of the present disclosure can be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol, WiFi or, more generally, any member of the IEEE 802.11 family of wireless protocols. For example, the various aspects described herein may be used as part of the IEEE 802.11ah protocol, which uses sub-1 GHz bands.

In some implementations, a WLAN includes various devices which are the components that access the wireless network. For example, clients (also referred to as stations or "STAs"). For example, an STA can be a laptop computer, a personal digital assistant (PDA), a mobile phone, etc. In an example, an STA connects to other STAs via a WiFi (e.g., IEEE 802.11 protocol) compliant wireless link to obtain general connectivity to the Internet or to other wide area networks.

A station "STA" can also include, be implemented as, or known as an access terminal ("AT"), a subscriber station, a subscriber unit, a mobile station, a mobile device, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, can be used in a neighborhood aware network (NAN), or social-WiFi network. For example, various stations within the network can communicate on a device to device (e.g., peer-to-peer communications) basis with one another regarding applications that each of the stations support. The social-WiFi network may be an ad hoc wireless network, a decentralized type of wireless network. The network is ad hoc because it does not rely on a preexisting infrastructure, such as access points in managed (infrastructure) wireless networks. It is desirable for a discovery protocol used in a social-WiFi network to enable mobile devices to advertise themselves (e.g., by sending discovery packets or messages) as well as discover services provided by other STAs (e.g., by sending paging or query packets or messages), while ensuring secure communication and low power consumption.

FIG. 1 illustrates an example of a wireless communication system 100 in which aspects of the present disclosure can be employed. The wireless communication system 100 includes a first mobile device cluster 110, a second mobile device cluster 120, a third mobile device cluster 130, and a mobile device 142.

The first mobile device cluster 110 includes mobile devices 112, 114, 116, 118. The second mobile device cluster 120 includes mobile devices 118, 122, 124, 126, 128. The third mobile device cluster 130 includes mobile devices 132, 134, 136, 138. In the particular example of FIG. 1, the mobile device 142 has not joined (e.g., is not a member of) any of the mobile device clusters 110, 120, 130. Further, in the particular example of FIG. 1, the mobile device 118 has joined (e.g., is a member of) multiple mobile device clusters (i.e., the mobile device clusters 110, 120).

The wireless communication system 100 can include mobile devices 112, 114, 116, 118, 122, 124, 126, 128, 132, 134, 136, and 138, which can communicate with any of the other mobile devices. As an example, the mobile device 112 can communicate with the mobile device 116. As another example, the mobile device 112 can communicate with the mobile device 118, although this communication link is not illustrated in FIG. 1.

A variety of processes and methods can be used for transmissions in the wireless communication system 100 between any two of the mobile devices. For example, signals can be sent and received in accordance with OFDM/OFDMA techniques. If this is the case, the wireless communication system 100 can be referred to as an OFDM/OFDMA system. Alternatively, signals can be sent and received between any two of the mobile devices in accordance with CDMA techniques. If this is the case, the wireless communication system 100 can be referred to as a CDMA system.

According to various embodiments, the wireless communication system 100 can be a neighborhood-aware network, and one or more of the mobile device clusters 110, 120, 130 can be associated with a particular common mobile device application. For example, each of the mobile device clusters 110, 120, 130 can be associated with a respective common mobile device application, such as a social networking mobile device application, a gaming mobile device application, or a combination thereof.

In operation, mobile devices of the wireless communication system 100 can communicate wirelessly according to one or more wireless communication protocols. For example, in at least one embodiment, mobile devices of the wireless communication system 100 can send and receive discovery messages, such as a discovery beacon associated with an Institute of Electrical and Electronics Engineers (IEEE) 802.11 protocol. As another example, mobile devices of the wireless communication system 100 can communicate via a network advertisement protocol that is common to each mobile device of the wireless communication system 100. As another example, the first mobile device cluster 110 can communicate using a second protocol that is different than the network advertisement protocol. Similarly, the second mobile device cluster 120 can communicate using a third protocol that is different than the network advertisement protocol, and the third mobile device cluster 130 can communicate using a fourth protocol that is different than the network advertisement protocol. In this context, a protocol refers to parameters used to communicate, such as a channel on which communications occur, timing of communications (e.g., timing of discovery intervals), etc.

To further illustrate, the mobile device 142 can turn on and remain in a listening state to receive a first discovery message via the network advertisement protocol common to the wireless communication system 100. For example, the mobile device 142 can receive the first discovery message from the mobile device 122. The first discovery message can include information specific to the second mobile device cluster 120, and can be referred to herein as a "cluster discovery message." For example, the information can indicate (e.g., advertise) the second mobile device cluster 120, such as by indicating characteristics of the protocol associated with the second mobile device cluster 120. The information can include an indication of a wireless channel associated with the second mobile device cluster 120 that can be different than a wireless channel associated with the network advertisement protocol. Alternatively or in addition, the information can include an indication of a timing parameter (e.g., a start time and/or a duration of a discovery interval) associated with the second mobile device cluster 120 that can be different than a timing parameter associated with the network advertisement protocol. Alternatively or in addition, the information can include a network size associated with the second mobile device cluster 120 (e.g., to enable mobile devices to determine whether to join the second mobile device cluster 120, for example based on whether an estimated bandwidth associated with the second mobile device cluster 120 is too small based on the network size exceeding a threshold). Alternatively or in addition, the information can include a duration of a discovery interval and/or a subsequent listening interval associated with the second mobile device cluster 120. Alternatively or in addition, the information can include cluster identifying information, such as information about a social networking mobile device application or a gaming mobile device application associated with the second mobile device cluster 120.

In response to receiving the first discovery message, the mobile device 142 can use the information in the first discovery message to communicate with the mobile device 122 using the protocol associated with the second mobile device cluster 120. For example, the mobile device 142 can join the second mobile device cluster 120, query a mobile device of the second mobile device cluster 120 for additional information (e.g., information related to a mobile device application) associated with the second mobile device cluster 120, or a combination thereof. Communicating with the mobile device 122 can include tuning a transceiver of the mobile device 142 from a first channel (associated with the network advertisement protocol) to the second channel (associated with the second mobile device cluster). After tuning to the second channel, the mobile device 142 can receive a second discovery message from the mobile device 122 at a time that is determined by a second timing parameter that is associated with the second mobile device cluster 120.

In another particular example, the mobile device 132 can send a second discovery message via the network advertisement protocol common to the wireless communication system 100. The second discovery message can include information specific to the third mobile device cluster 130. One or more other devices can receive the second discovery message. For example, the mobile device 128 can receive the second discovery message sent by the mobile device 132. The mobile device 132 can receive a message from the mobile device 128 that is sent based on the information specific to the third mobile device cluster 130. The message can be sent using the protocol associated with the third mobile device cluster 130. The message sent from the mobile device 128 can be a request to join the third mobile device cluster 130, a query for additional information related to the third mobile device cluster 130, or a combination thereof.

In a particular embodiment, each of the mobile device clusters 110, 120 and 130 can be advertised during a discovery interval associated with the network advertisement protocol common to the wireless communication system 100. For example, during a first discovery interval associated with the network advertisement protocol common to the wireless communication system 100, a particular device of the first mobile device cluster 110 (such as the mobile device 114) can send a discovery message advertising the first mobile device cluster 110. Additionally, during the first discovery interval, a particular device of the second mobile device cluster 120 (such as the mobile device 126) can send a discovery message advertising the second mobile device cluster 120. Further, during the first discovery interval, a particular device of the third mobile device cluster 130 (such as the mobile device 136) can send a discovery message advertising the third mobile device cluster 130. Thus, during the first discovery interval, the mobile device 142 can receive discovery messages associated with each of the mobile device clusters via the network advertisement protocol common to the wireless communication system 100 (e.g., by tuning to a channel associated with the network advertisement protocol common to the wireless communication system 100). Accordingly, the mobile device 142 does not have to scan a variety of channels (such as channels associated with each of the mobile device clusters 110, 120, and 130, to identify mobile device clusters that are active in a particular area.

It will be appreciated that utilizing the network advertisement protocol common to the wireless communication system 100 can enable transmission and reception of information related to particular clusters of mobile devices (e.g., any of the mobile device clusters 110, 120, 130). Further, by communicating according to cluster specific protocols that are different from the network advertisement protocol, each of the mobile device clusters 110, 120, 130 can tailor communications according to cluster-specific characteristics, such as one or more particular mobile device applications associated with the particular mobile device cluster.

Figure 2:
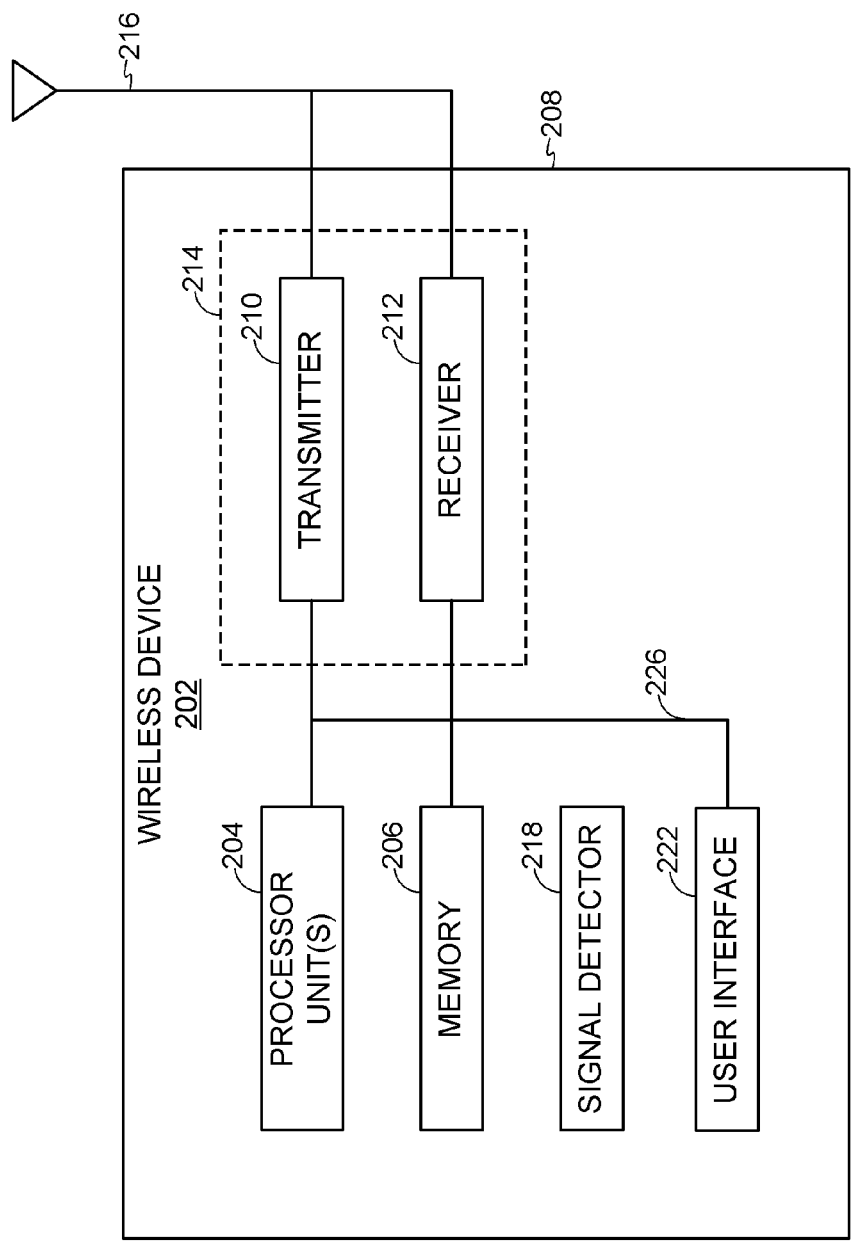
FIG. 2 shows a functional block diagram of a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include one of the mobile devices.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as a mobile device, the processor 204 can be configured to process packets of a plurality of different packet types. For example, the processor 204 can be configured to determine the type of packet and to process the packet and/or fields of the packet accordingly. When the wireless device 202 is implemented or used as a mobile device, the processor 204 can also be configured to select and generate one of a plurality of packet types. For example, the processor 204 can be configured to generate a discovery packet (such as a cluster discovery message and/or a discovery message) and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

To ensure proper communication between multiple mobile devices, mobile devices can receive information regarding characteristics of the mobile devices. For example, the mobile device 142 (FIG. 1) can receive timing information about a mobile device 114 (FIG. 1) in order to synchronize timing of communication between the mobile device 142 and the mobile device 114. Additionally or alternatively, the mobile device 142 can receive other information such as a medium access control (MAC) address of another mobile device, etc. The mobile device 142 can determine whether it needs such information independently, such as through software that is executed using memory 206 and processor 204.

The mobile device 142 (FIG. 1) can have a plurality of operational modes. For example, the mobile device 142 can have a first operational mode referred to as an active mode, normal operation mode, or full power mode. In the active mode, the mobile device 142 can always be in an "awake" state and actively transmit/receive data with another mobile device. Further, the mobile device 142 can have a second operational mode referred to as a power-save mode or sleep mode. In the power-save mode, the mobile device 142 can be in the "awake" state or can be in a "doze" or "sleep" state where the mobile device 142 does not actively transmit/receive data with another mobile device. For example, the receiver 212 and possibly DSP 220 and signal detector 218 of the mobile device 142 can operate using reduced power consumption in the doze state. Further, in the power-save mode, an mobile device 142 can occasionally enter the awake state to listen to messages from other mobile devices (e.g., paging messages) that indicate to the mobile device whether or not the mobile device needs to "wake up" (e.g., enter the awake state) at a certain time so as to be able to transmit/receive data with another mobile device.

Figure 3:
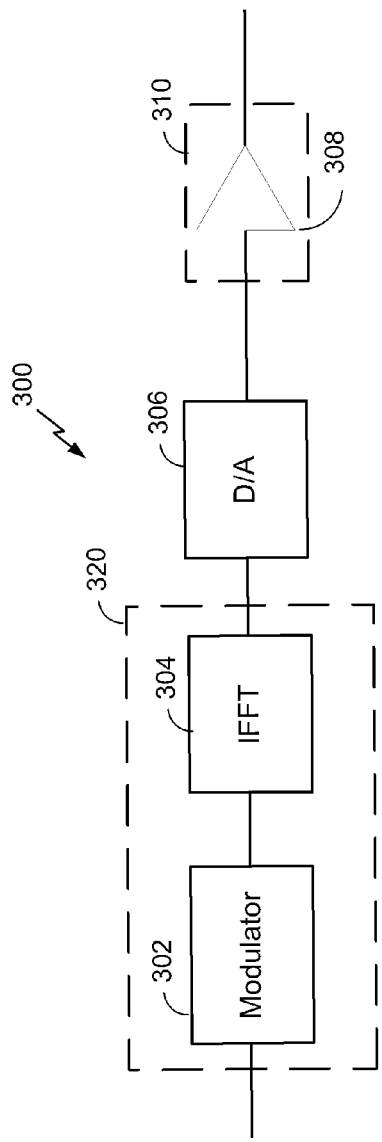
FIG. 3 illustrates various components that may be utilized in the wireless device to transmit wireless communications.

As discussed above, the wireless device 202 may comprise an AP 104 or an STA 106, and may be used to transmit and/or receive communications. FIG. 3 illustrates a transmitter module 300 that may be utilized in the wireless device 202 to transmit wireless communications. The components illustrated in FIG. 3 may be used, for example, to transmit OFDM communications.

The transmitter module 300 may comprise a modulator 302 configured to modulate bits for transmission. For example, if the transmitter module 300 is used as a component of wireless device 202 in FIG. 2, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The transmitter module 300 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 320. In some aspects, however, one or both of the modulator 302 and the transform module 304 may be implemented in other components of wireless device 202, such as in the processor 204.

Generally, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the transmitter module 300 may further comprise a digital to analog converter 306 configured to convert the output of the transform module into an analog signal. For example, the time-domain output of the transform module 306 may be converted to a baseband OFDM signal by the digital to analog converter 306. In some aspects, portions of the transmitter module 300 may be included in wireless device 202 from FIG. 2. For example, the digital to analog converter 306 may be implemented in the processor 204, the transceiver 214, or in another element of the wireless device 202.

The analog signal may be wirelessly transmitted by the transmitter 310. The analog signal may be further processed before being transmitted by the transmitter 310, for example by being filtered or by being unconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using a processor and/or the DSP 320, for example using the modulator 302 and the transform module 304 as discussed above. Data units that may be generated and transmitted as discussed above are described in additional detail below with respect to FIGS. 5-7.

Figure 4:
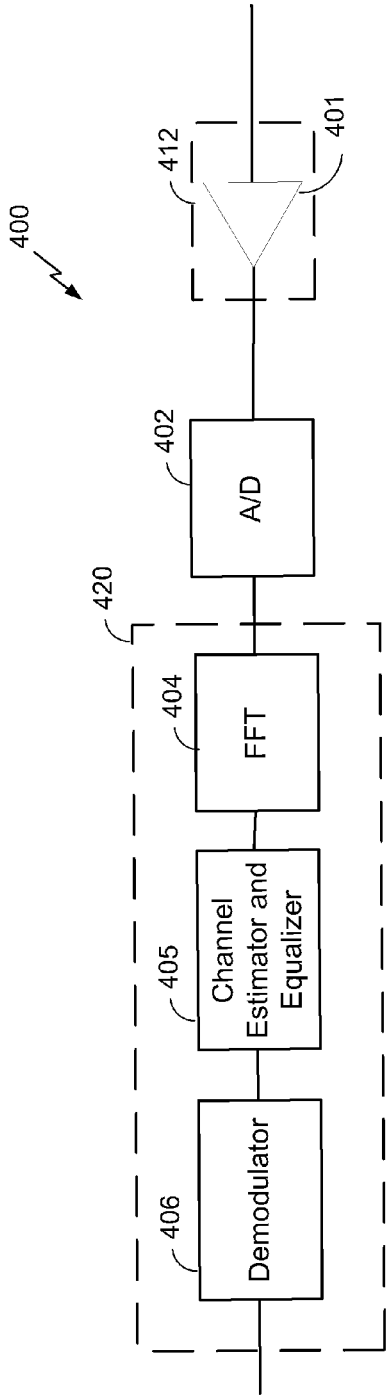
FIG. 4 illustrates various components that may be utilized in the wireless device to receive wireless communications.

FIG. 4 illustrates a receiving module 400 that may be utilized in the wireless device 202 to receive wireless communications. The components illustrated in FIG. 4 may be used, for example, to receive OFDM communications. In some aspects, the components illustrated in FIG. 4 are used to receive data units that include one or more training fields, as will be discussed in additional detail below. For example, the components illustrated in FIG. 4 may be used to receive data units transmitted by the components discussed above with respect to FIG. 3.

The receiver 412 is configured to receive one or more packets or data units in a wireless signal. Data units that may be received and decoded or otherwise processed as discussed below are described in additional detail with respect to FIGS. 5-7.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The receiving module 400 may comprise an analog to digital converter 402 configured to convert the amplified wireless signal from the receiver 412 into a digital representation thereof. Further to being amplified, the wireless signal may be processed before being converted by the digital to analog converter 402, for example by being filtered or by being downconverted to an intermediate or baseband frequency. In some aspects, the analog to digital converter 402 may be implemented in the processor 204 of FIG. 2, the transceiver 214, or in another element of the wireless device 202.

The receiving module 400 may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The receiving module 400 may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The receiving module 400 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. In some aspects, where the receiving module 400 is implemented as a portion of wireless device 202, the bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 may be implemented in another component of wireless device 202, such as in the processor 204.

As discussed above, the wireless signal received at the receiver 412 comprises one or more data units. These data units may be decoded, evaluated and/or processed using the components described above. For example, a processor and/or or the DSP 420 may be used to decode data symbols in the data units using the transform module 404, the channel estimator and equalizer 405, and the demodulator 406.

Data units exchanged by the AP 104 and the STA 106 may include control information or data. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. For example, the training fields may include one or more long training field (LTF) and one or more short training field (STF). The payload may comprise a Media Access Control (MAC) header and/or user data. The payload may be transmitted using one or more data symbols, such as BPSK symbols or QPSK symbols.

To ensure scalable operation in a social-WiFi network such as the mobile device cluster (110, 120, and 130), transmissions by each device in the network should be controlled based on the number of devices in the network. For example, it may be desirable to adjust the rate at which beacons and/or timing signals are transmitted based on the number of devices in the network. In many applications, it is sufficient to obtain a rough estimate of the number of devices in the network. One way for a wireless device to track the number of devices in the network is to simply store any identifier received in a message and representing a device. Whenever a new message is received, the device will compare the identifier in the new message to identifiers already stored at the device and store the identifier if it has not been previously stored. However, this approach can lead to large memory requirements and needs for sorting a larger number of received identifiers. Thus it is beneficial to have a method of tracking the number of devices in a wireless network, which can largely reduce the larger memory requirements and the needs for sorting the identifiers.

In implementations as will be described below, a Bloom filter (which will be described below in further detail) is used to track the identifiers of the devices in the network. The Bloom filter is a bit array of m bits with k hash functions associated therewith. Whenever a message is received from another wireless device which includes an identifier associated with the another wireless device, the identifier is added into the Bloom filter. The density of zeros in the Bloom filter is used to estimate the number of devices in the Bloom filter. In some aspects, the density of ones may be used to estimate the number of devices in the Bloom filter. Because the Bloom filter includes a predefined numbers of bits, and each bit may be set to either zero or one, it may be simple, mathematically, to determine the number of ones in the Bloom filter once the number of zeros are known, and vice versa. Accordingly, to determine the number of devices in the network, either the number of zeros or the number of ones in the Bloom filter may be used.

Figure 5:
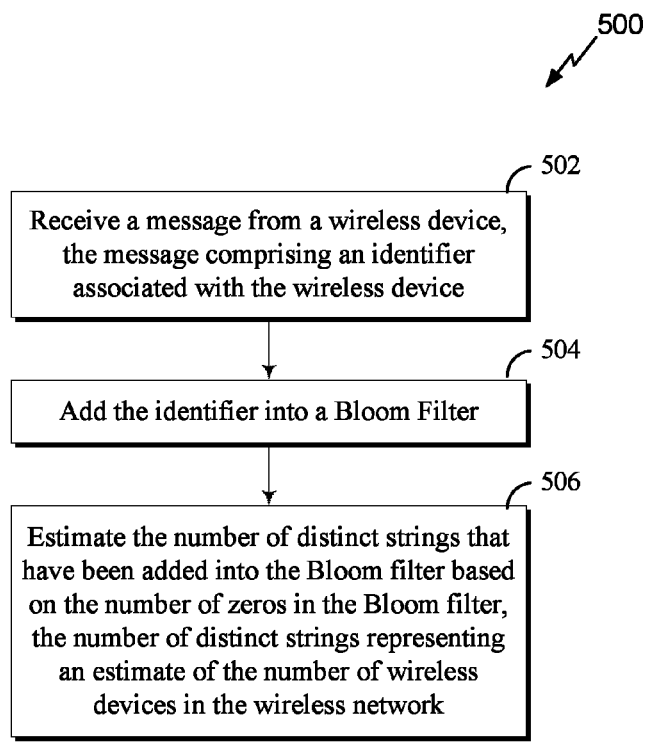
FIG. 5 is a flowchart of a method of monitoring the number of wireless devices in a wireless network in accordance with one implementation.

FIG. 5 is a flowchart of a method of monitoring the number of wireless devices in a wireless network in accordance with one implementation. The method 500 may be performed by a wireless device such as the mobile device 112 (shown in FIG. 1). In one implementation, the wireless network is a social-WiFi network or an ad hoc network. The wireless network may be the mobile device cluster 1120, 120 and 130 (shown in FIG. 1). However, the method may also be used in an infrastructure type wireless network (e.g., a network including an access point), wherein the wireless devices may moderate their behavior based on the number of other devices around them.

At block 502, the method includes receiving a message from a wireless device, the message comprising an identifier associated with the wireless device. The message may be received by, for example, the receiver 212 of the wireless device 202 (shown in FIG. 2) from another wireless device in the wireless network (also referred to as "neighboring wireless device.") The term "neighboring wireless device" simply refers to another wireless device in the same wireless network. The message may be any packet or frame from another wireless device. In the exemplary implementation, the message includes an identifier associated with the neighboring wireless device.

Moving to block 504, the method includes adding (or inputting) the identifier into a Bloom filter. This process may be performed by, for example, the processor 204 of the wireless device 202 (shown in FIG. 2). In one implementation, the identifier is added into the Bloom filter whenever a message is received from another wireless device.

The Bloom filter is a space efficient probabilistic data structure. The Bloom filer includes a bit array of m bits and k different hash functions. Each bit may have a value of zero or one. Each of the k different hash functions maps an input string to one of the m array positions with a uniform random distribution. In the exemplary implementation, the m bits are all initialized to zero. Whenever an identifier is received, the identifier is added into the Bloom filter. The process of adding the identifier into the Bloom filter includes a) feeding the identifier as an input string to each of the k hash functions, wherein each hash function maps the input string to one array position, and b) setting the bits at the array positions identified by the k hash functions to one.

Next at block 506, the method includes estimating the number of distinct strings that have been added into the Bloom filter based on the number of zeros in the Bloom filter, wherein the number of the distinct strings represents an estimate of the number of wireless devices in the wireless network. This process may be performed by, for example, the processor 204 of the wireless device 202 (shown in FIG. 2). In one implementation, the number of distinct strings is determined based on the density of ones in the Bloom filter (or the density of zeros in the Bloom filter). The estimate number of distinct inputs the number of distinct strings $N_{distinct}$ $N_{distinct}$ that have been added into the Bloom filter may be calculated by, for example, the following formula:

$$N_{distinct} = \frac{-\log\left(\frac{N_0}{m}\right)}{k * \log\left(1 - \frac{1}{m}\right)} \quad (1)$$

wherein $N_0$ denotes the number of zeros in the Bloom filter's m-bit array. Thus, the method allows monitoring the number of devices in the wireless network without the need to track or store individual identifiers. As a result, the method requires only low storage space. In one alternative implantation, the formula (1) may be simplified as follows:

$$N_{distinct} = -\frac{m}{k} * \log\left(\frac{N_0}{m}\right) \quad (1a)$$

The formula (1a) exploits the fact that $\log(1-1/m)$ is approximately equal to $1/m$, particularly when m is sufficiently large.

In one implementation, the method may further include an optional process, wherein as a first wireless device joins a wireless network, the wireless device requests a second wireless device to provide the current Bloom filter of the second device. This helps the first device to get current on the number of devices in the wireless network. From this point on, the first device can count any additional devices by updating the Bloom filter received from the second device. In one implementation, the second wireless device may be one of the first device's neighbors. In another implementation, the first wireless device may request a plurality of neighboring wireless devices to provide their current Bloom filter. If the first wireless device receives Bloom filters from two or more wireless devices, the first wireless device may perform a bitwise OR operation of the Bloom filters received and store the resulting Bloom filter as the current Bloom filter for the first wireless device. In one implementation, the wireless device may receive a message from one neighboring wireless device, which includes the Bloom filer of the neighboring wireless device and the time at which the Bloom filter of the neighboring wireless device was started. This allows the wireless device receiving the Bloom filter to know whether the received Bloom filter is too old and whether to allow the received Bloom filter to expire.

In some applications, the accuracy of the estimate made by this method may be impaired by the departure of some wireless devices without explicitly indicating that they are leaving the network. In addition, the accuracy of this method is also impaired by some wireless devices continuously changing their MAC addresses for security reasons. There are various ways to address the impact of these factors. For example, the method may further include an optional process which allows the wireless device to reset randomly selected bits of the Bloom filter at random intervals of time. The number of bits to be reset and the distribution of the random intervals may be decided based on one of more of the following: the number of wireless devices in the network, the rate at which wireless devices leave the network (which may come from an external source), and the interval at which wireless devices change their addresses. In one implementation, this process of resetting selected bits of the Bloom filter also requires a wireless device to send discovery messages from time to time to ensure that they are not completely disregarded by the Bloom filter in counting the number of devices in the network. The frequency at which a wireless device sends such discovery messages is determined by the parameter of such process for resetting selected bits of the Bloom filter.

As an alternative, the method may assign a counter for each bit of the m-bit array in the Bloom filter. There may be m counters for the m-bit array, with each counter assigned to a different bit of the m-bit array. The counter may be set to an integer value between zero and a maximum value C_max. For example, if the counter has 3 bits, then C_max may have a value of 7. Each time a bit of the m-bit array in the Bloom filter is set to 1, the counter associated with the bit is reset to the value of C_max. The value of each counter that has a non-zero value is reduced by 1 for every time interval of a duration T. For example, the duration T may be 100 microseconds or 1 minute, depending on the application. In one implementation, the duration T may be decided based on one of more of the following: the rate at which wireless devices leave the network (which may come from an external source) and the interval at which wireless devices change their addresses. When the value of a counter is reduced to zero, the bit corresponding to the counter is set to zero. As described above, the size of the network may be estimated based on the bits in the Bloom filter that are set to zero, or set to one.

In one implementation, the method may further include an optional process, wherein the wireless device requests a copy of the Bloom filter from a first neighboring wireless device. The wireless device then generates a first Bloom filter by performing a bitwise AND of the Bloom filter of the wireless device and the Bloom filter of the first neighboring wireless device. The wireless then estimates the number of neighboring wireless devices, which the wireless device and the first neighboring wireless device have in common, based on the first Bloom filter. The density of ones in the first Bloom filter is also a good estimate of the number of devices in the intersection of the set of neighbors.

As described above, the Bloom filter includes k different hash functions, each of which maps an input string to a bit position in the bit array. The hash function may be, for example, a cyclic redundancy check (CRC) of an input string. In one implementation, the k different hash functions may be created using a single hash function (e.g., a CRC) and k different strings (referred to as the "modification string"). For each input string to the Bloom filer (referred to as the "Bloom input string"), k different input strings (referred to as the "hash input strings") are generated, wherein each hash input string is created by appending the Bloom input string with a different one of the k modification strings. Subsequently, each of the k different hash input strings is fed into the single hash function thus generating a bit positions in the bit array. As there are k different hash input strings, k bit positions in the bit array are identified (some of them may be the same pit position). As a result, the Bloom filter simulates k different hash functions using a single hash function and k different strings.

In another implementation, the k hash input strings may be created in a different way. In one example, each hash input string may be created by appending a different one of the modification strings to the Bloom input string. In another example, each hash input hash input string may be created by inserting a different one of the modification strings in between the Bloom input string.

As described above, the Bloom filer includes a bit array of m bits and k different hash functions. In one implementation, the number of hash functions k has a value of 1, and the size of the bit array m has a value being about two times the maximal size of the wireless network to be estimated. In certain applications, this simple Bloom filter is sufficient for the problem of estimating the number of neighbors. In another implementation, the Bloom filter is designed to track up to N devices, and the bit array m of the Bloom filter is designed to have N bits. In another implementation, the size of the Bloom filter (the value of the parameters m and k) may be determined based on the desired number of distinct identifiers to be stored in the Bloom filter (denoted by n) and the desired false alarm probability (denoted by p) that an identifier that has not been added in the filter being determined as being in the Bloom filter, using the following formula:

$$m=-n*\ln(p)/(\ln(2))^2 \qquad (2)$$

$$k=(m/n)\ln(2) \qquad (3)$$

In one implementation, the identifier in the message may be associated with the neighboring wireless device, or a service or an application. The identifier in the message may be a MAC address of a discovery frame which identifies the wireless device sending the frame. The identifier may also be a service identifier in a frame, wherein the service identifier may be in the body of the frame or may replace one of address fields in the frame. As another example, the identifier may be an identifier based on the particular application and located in the body of the frame. Thus, the method uses the Bloom filter to estimate the number of distinct identifiers a wireless device receives.

Figure 6:
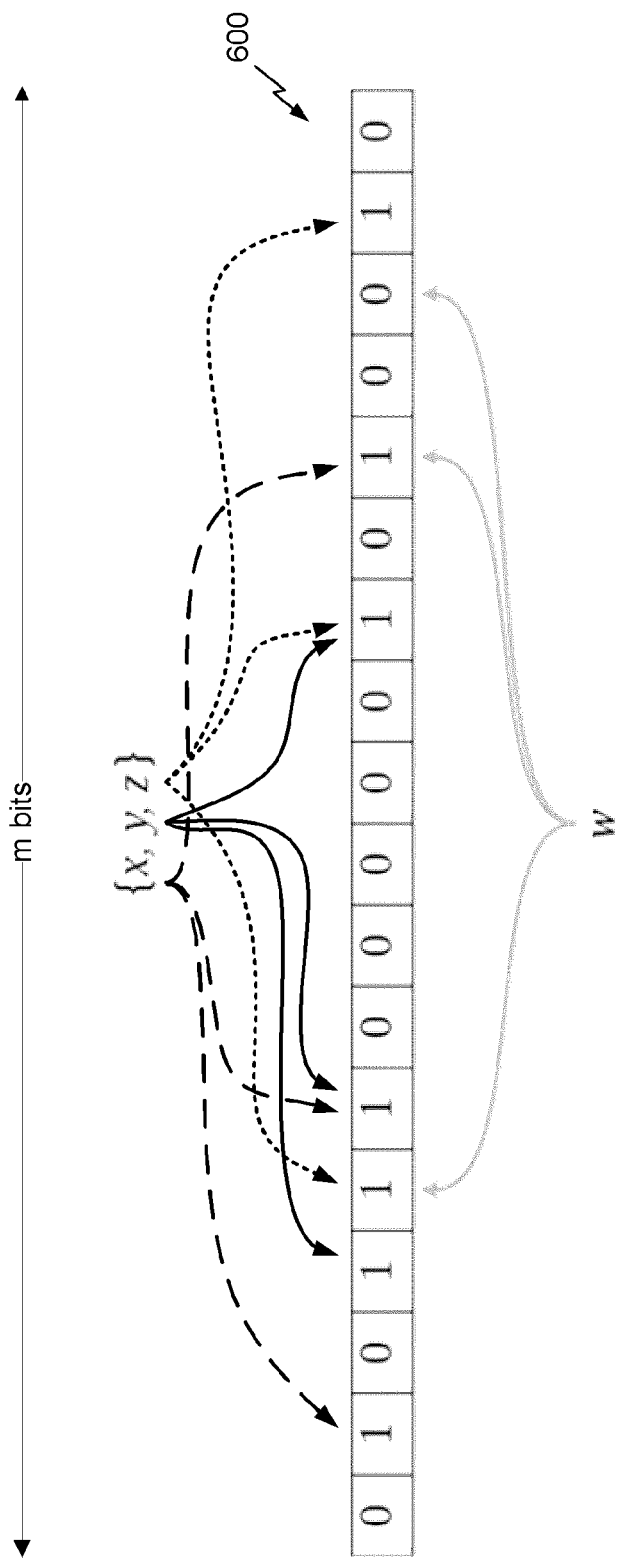
FIG. 6 shows one illustrative example of a Bloom filter in accordance with one implementation.

FIG. 6 shows one illustrative example of a Bloom filter in accordance with one implementation. The Bloom filter includes a bit array (600) of m bits all initialized to zero and k different hash functions (not shown), wherein m=18 and k=3. Each of the k different hash functions maps or hashes an input string to one of the m array positions with a uniform random distribution. Three input strings, namely, x, y, and z, have been added into the Bloom filter. For the input string x, the Bloom filter maps it to three different bit positions in the bit array (using the k hash functions not shown), as indicated by the three arrows initiating at x in FIG. 6. As a result, the three bit positions corresponding to the input string "x" all have a value of 1. Similarly, the input strings y and z are added into the Bloom filter, by mapping each of these strings to three different bit positions in the bit array and setting these bits positions to a value of 1. The resulted bit array of the Bloom filter is shown in FIG. 6. To determine whether an input string w has been added into the Bloom filter, the Bloom filter maps the input string w to three bit positions in the bit array, as indicated by the three arrows initiating at w. As one of the bit positions corresponding to the input string w has a value of 0, it is determined that the input string w is not in the Bloom filter. This determination is correct because the Bloom filter only stores x, y, and z, not w.

Figure 7:
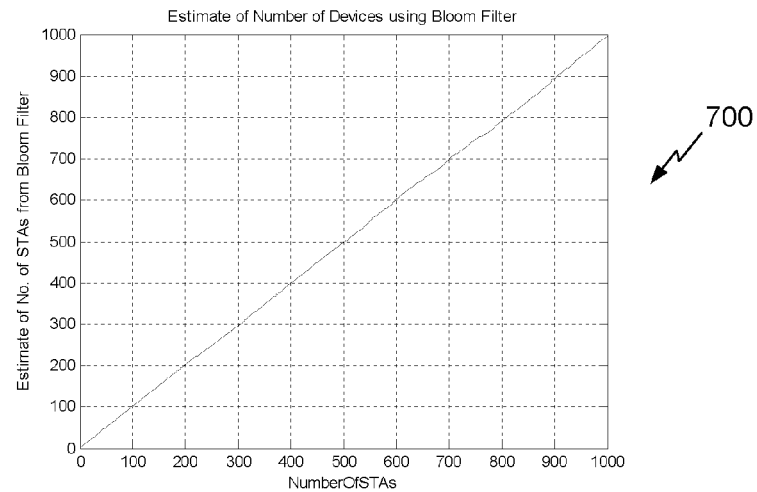
FIG. 7 illustrates simulation results comparing the number of wireless devices in the network and the estimated number from the Bloom filter.
Figure 8:
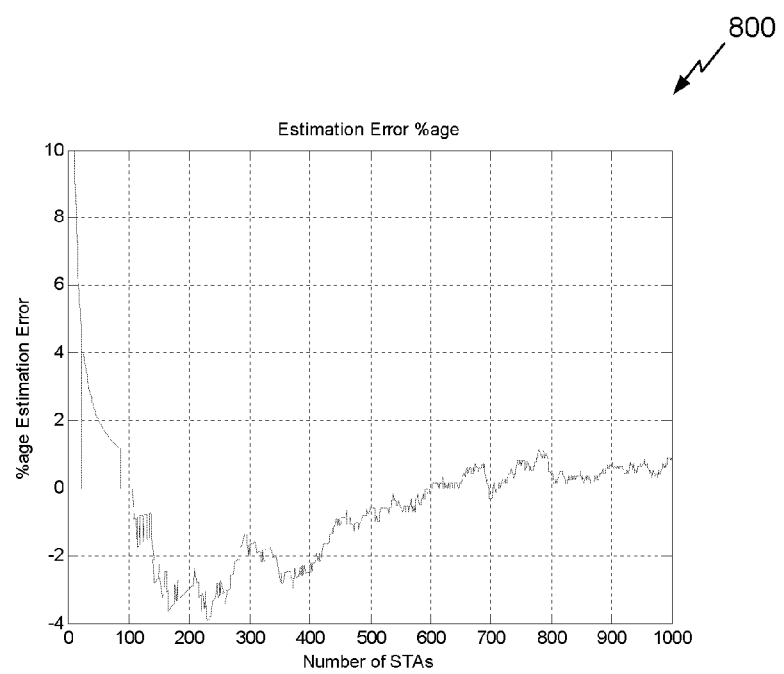
FIG. 8 illustrates simulation results showing the estimation error percentage versus the number of wireless devices in the network.

FIG. 7 illustrates simulation results 700 comparing the number of wireless devices in the network and the estimated number from the Bloom filter. FIG. 8 illustrates simulation results 800 showing the estimation error percentage versus the number of wireless devices in the network. In the simulation, the Bloom filter has a bit array of 600 bytes and four hash functions. As shown in FIGS. 7 and 8, the simulation results indicate that, for a wireless network including over fifty devices, the estimation error is within about 2% of the actual number of devices.

In some of the foregoing implementations, the Bloom filter includes k different hash functions (referred to as "Bloom hash function"), each of which maps an input string to a bit position in the bit array of m bits. The Bloom hash function may be realized using a hash function (referred to as "general hash function") that maps an input string to a single integer between 0 and p−1, wherein p is no less than m. The Bloom hash function may be realized by first using the general hash function to map the input string to a single integer between 0 and p−1, and then applying a modulus operation to find the remainder of division of the single integer by m, wherein the remainder corresponds to a bit position in the bit array of m bits. The remainder is the value returned by the Bloom hash function. Thus, the Bloom hash function may be represented as follows:

$$\text{Bloom Hash} = \text{remainder}(\text{General Hash}(\text{input string}), m) \qquad (4)$$

In one implementation, the general hash function may be, for example, a cyclic redundancy check (CRC) of an input string. In one implementation, the general hash function of the Bloom filer may be a function that selects a plurality of bits from the input string and arranges the bits in a sequence according to a pattern. The value of the sequence of the bits thus represents the output integer of the general hash function. The bits selected from the input string do not necessarily be continuous within the input string. The general hash function may generate the bit sequence based on a pre-defined pattern. For example, the pre-defined pattern may define sequence of B bits of the input string starting from the first bit, the last bit, the middle bit, the bit at a pre-defined offset from the start, or the bit at a pre-defined offset from the end. The pre-defined pattern may define a sequence of B bits at odd positions of the identifier string or a sequence of B bits at even positions of the identifier string, wherein the sequence starts from the first bit, the last bit, the middle bit, the bit at a pre-defined offset from the start, or the bit at a pre-defined offset from the end. In another example, the pre-defined pattern may define a sequence of bits including Bit 1, Bit 37, Bit 8, Bit 9, Bit 15, Bit 3, and Bit 2 from the input string.

In some of the foregoing implementations, a wireless device requests a second wireless device to provide the current Bloom filter of the second device, upon joining a wireless network. In one implementation, the Bloom filter may be exchanged using a discovery type length value (TLV) with designated management service identification (e.g., 0x000000 or 0xFFFFFF reserved for management operations). The Bloom filer may be stored in an optional field of the discovery TLV called Management Specific Information Container.

The discovery TLV may be carried in a vendor specific discovery frame. Alternatively, the TLV may be carried as an attribute in a peer-to-peer (P2P) information element (e.g., in a WiFi-direct system). The information element may be a vendor specific information element. In one implementation, a protocol for exchanging the Bloom filer starts when a new wireless station scans for neighborhood aware network (NAN) sync beacon or a discovery frame. Once a sync beacon or a discovery frame is received, the new station sends a request for the Bloom filter to the sender of the sync beacon or the discovery frame. The request is made using a management discovery TLV. The sender of the sync beacon or discovery frame then responds with the Bloom filter in a management discovery TLV.

FIG. 9 illustrates an example vendor-specific discovery frame 900. In the illustrated implementation, the vendor-specific discovery frame 900 includes a category field 910, an action field 920, an organizationally unique identifier (OUI) field 930, an OUI type field 940, an OUI subtype 950, a dialog token 960, and one or more discovery type length value (TLV) fields 970-980. As shown, the category field 910 is one octet, the action field 920 is one octet, the OUI field 930 is three octets, the OUI type field 940 is one octet, the OUI subtype 950 is one octet, the dialog token 960 is one octet, and the one or more discovery TLV fields 970-980 are of variable length. In various implementations, the vendor-specific discovery frame 900 can omit one or more fields shown in FIG. 9. A person having ordinary skill in the art will appreciate that the fields in the vendor-specific discovery frame 900 can be of different suitable lengths, and can be in a different order.

In some implementations, the category field 910 can indicate a public action frame. The action field 920 can indicate a vendor-specific action frame. The OUI field 930 can be used to uniquely identify a vendor, manufacturer, or other organization (referred to as an "assignee") globally or worldwide and can effectively reserve a block of each possible type of derivative identifier (such as MAC addresses, group addresses, Subnetwork Access Protocol identifiers, etc.) for the exclusive use of the assignee. The OUI type field 940 can be used to indicate a type of the OUI field 930 such as a MAC identifier, a context dependent identifier (CDI), an extended unique identifier (EUI), etc. The OUI subtype field 950 can indicate a subtype of the OUI type field 940. The dialog token 960 can be chosen to indicate a particular transaction. The TLV fields 970 and 980 are described herein in greater detail with respect to FIG. 10.

FIG. 10 shows an discovery type length value (TLV) 1000 that may be employed within the wireless communication system 100 of FIG. 1. The discovery TLV 1000 may be transmitted in various messages such as a discovery frame and a P2P information element. The TLV 1000 may be implemented in the discovery frame 900 as the TLV 970 and 980 (shown in FIG. 9). In various implementations, any device described herein (e.g., a wireless device such as the mobile device 112 shown in FIG. 1), can transmit the discovery TLV 1000.

In the illustrated implementation, the discovery TLV 1000 includes a service identifier 1010, a length field 1020, an optional service control field 1030, an optional range control field 1050, a management control field 1060, and an optional management specific information container 1070. A person having ordinary skill in the art will appreciate that the discovery TLV 1000 can include additional fields, and fields can be rearranged, removed, and/or resized. For example, in various implementations, the discovery TLV 1000 can omit the service control field 1030, the range control field 1050, and/or the management control 1060.

In the illustrative implementation, the service identifier field 1010 shown is six octets long. In some implementations, the service identifier field 1010 can be of variable length, such as varying length from signal to signal and/or as between service providers. The service identifier field 1010 can include a value which identifies a service or application of a discovery frame. For example, the service identifier 1010 can include a hash of a service name or other value based on a service. In some implementations, a predetermined token value can be reserved. For example, service identifiers of all-zeros or all-ones can indicate NAN management operations.

The length field 1020 can be used to indicate the length of the discovery TLV 1000 or the total length of subsequent fields. The length field 1020 shown in FIG. 10 is one octet long. In some implementations, the length field 1020 can be of variable length, such as varying length from signal to signal and/or as between service providers. In some implementations, a length of zero (or another predetermined token value) can indicate that one or more other fields (such as the service control field 1030, the range control field 1050, the management control 1060, and/or the management specific information container 1070) are not present.

The service control field 1030 can include information of an applicable service. The service control field 1030 shown in FIG. 10 is one octet long. In some implementations, the service control field 1030 can be of variable length, such as varying length from signal to signal and/or as between service providers.

The range control field 1050 can include information related to the management control 1060. The range control field 1050 shown in FIG. 10 is one octet long. In some implementations, the range control field 1050 can be of variable length, such as varying length from signal to signal and/or as between service providers.

The management control field 1060 can be used to carry information related to management control. In the illustrative implementation, the management control field 1060 can be one or two octets long. In some implementations, the management control field 1060 has a variable length.

The management specific information container 1070 can be used to carry additional information related to. The management specific information container 1070 shown in FIG. 10 is variable length. In the illustrative implementation, the management specific information container 1070 may be used to contain the Bloom filter.

In some embodiments, one or more nodes of a peer-to-peer network can transmit synchronization messages to coordinate one or more availability windows for communication between nodes of the peer-to-peer network. The nodes can also exchange discovery queries and responses to provide for service discovery between devices operating within the same peer-to-peer or neighborhood aware network. A neighborhood aware network can be considered a peer-to-peer network or an ad-hoc network in some aspects. The nodes repeatedly wake from a sleep state to periodically transmit and/or receive synchronization messages and discovery messages. It would be advantageous if the nodes were able to stay longer in a sleep state to conserve power and not wake from the sleep state to transmit and/or receive synchronization messages on the network. In addition, the transmission and retransmissions of synchronization and discovery messages by the nodes can introduce a large amount of unnecessary overhead to the network.

In some embodiments, only a subset of nodes can be configured to transmit synchronization messages, for example, in order to reduce network congestion. In some embodiments, a subset of nodes can be designated or elected "master" nodes. For example, nodes that have access to an external power source can be elected as master nodes, whereas nodes that run on battery power may not. In various embodiments, nodes can be designated as one or more different types of master nodes including: discovery master nodes, synchronization master nodes, and/or anchor master nodes. In some embodiments, one or more discovery master nodes can transmit NAN discovery messages, while other nodes may not. In some embodiments, one or more synchronization master nodes can transmit synchronization messages, while other nodes may not.

In some embodiments, one or more anchor master nodes can be preferentially elected as synchronization master nodes and/or discovery master nodes. Anchor nodes can be preset, elected as described herein with respect to master node election, or determined in another manner. NANs having an anchor node can be referred to as anchored NANs and NANs having no anchor node can be referred to as non-anchored NANs. In an embodiment, a NAN can have a single anchor master node.

In some embodiments, one or more nodes in a NAN can elect one or more master nodes based on a dynamically determined or preset master preference value (MPV). For example, nodes with access to an external power source can set their MPV higher (e.g., 10), whereas nodes on battery power can set their MPV lower (e.g., 5). During the election process, nodes having a higher MPV can be more likely to be elected master nodes. In some embodiments, anchor nodes can have a higher MPV than non-anchor nodes, and thus can be more likely to be elected as master nodes.

Figure 11:
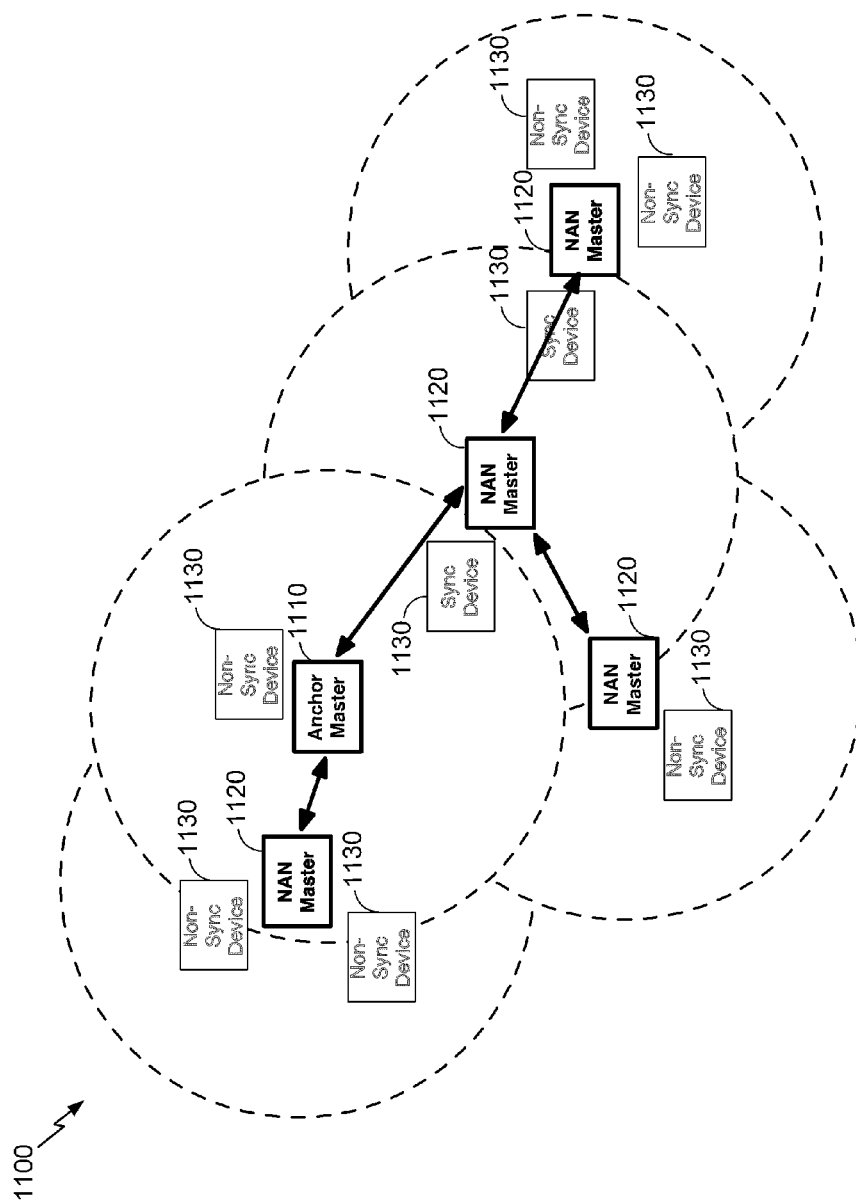
FIG. 11 illustrates an example of another wireless communication system in which aspects of the present disclosure can be employed.

FIG. 11 illustrates an example of another wireless communication system 1100 in which aspects of the present disclosure can be employed. The wireless communication system 1100 includes an anchor node 1110, master nodes 1120, and non-master nodes 1130. In various embodiments, the wireless communication system 1100 can be similar to the wireless communication system 100 (FIG. 1). For example, one or more nodes 1110-1130 can include any of the mobile devices 112-118, 122-128, and 132-142 (FIG. 1). In some embodiments, one or more nodes 1110-1130 can include the wireless device 202 (FIG. 2) and can implement the method 500 (FIG. 5). In some embodiments, each master node 1120 and/or the anchor node 1110 can correspond with a particular cluster, such as the clusters 110, 120, and 130 discussed above with respect to FIG. 1.

In some embodiments, each master node 1120 can track identifiers of other nodes within radio range. For example, each master node 1120 can populate a Bloom filter with identifiers of other nodes within range, as discussed above with respect to FIGS. 5-6. Thus, in some embodiments, each master node 1120 can populate its Bloom filter by hashing a transmit address of all NAN frames received from devices within its associated cluster. In some embodiments, each master node 1120 can track identifiers for only devices within its cluster. In some embodiments, each master node 1120 can track identifiers for any discovered device regardless of cluster. In some embodiments, master nodes 1120 can refrain from tracking identifiers of other master nodes 1120 and/or anchor nodes 1110. In other embodiments, master nodes 1120 can track identifiers including those of other master nodes and/or anchor nodes 1110. In various embodiments, the anchor node 1110 can track identifiers as described herein with respect to master nodes 1120.

In various embodiments, the master nodes 1120 can form a tree topology with a root at the anchor node 1110. Each master node 1120 can maintain information indicating a hop distance to the anchor node 1110. In some embodiments, the anchor node 1110 and master nodes 1120 can estimate and propagate cluster size according to the tree topology. As discussed herein, each master node 1120 and/or the anchor node 1110 can receive Bloom filters from other nodes. Each master node 1120 and/or the anchor node 1110 can perform a bitwise OR operation of the received Bloom filters and the current or local Bloom filter for the first wireless device. In some embodiments, each master node 1120 and/or the anchor node 1110 can request the Bloom filters. In some embodiments, each master node 1120 and/or the anchor node 1110 can receive Bloom filters without request.

In some embodiments, each master node 1120 and/or the anchor node 1110 can receive Bloom filters only from adjacent master nodes 1120 in the tree topography. In some embodiments, each master node 1120 and/or the anchor node 1110 can receive Bloom filters only from child nodes in the tree topography. In some embodiments, each master node 1120 can perform the bitwise OR operation between received Bloom filters and local Bloom filters before sending a merged Bloom filter to a parent node. Accordingly, in some embodiments, the anchor node 1110 can eventually build a Bloom filter containing the bitwise OR of all Bloom filters in the wireless communication system 1100. In some embodiments, the anchor node 1110 can eventually build a Bloom filter all discovered identifiers in the wireless communication system 1100.

As discussed above, in some embodiments, each master node 1120 and/or the anchor node 1110 can request Bloom filters from other nodes such as, for example, from each child node or child master node 1120. In some embodiments, each master node 1120 and/or the anchor node 1110 can transmit the request using a service discovery frame (SDF). For example, each master node 1120 and/or the anchor node 1110 can transmit a service discovery frame including a service discovery attribute 1300 (FIG. 13) having a publish bit set.

In various embodiments, the request for discovered devices can include an indication of devices from which the transmitting device has received an indication of discovered devices. For example, the anchor node 1110 can transmit a discovered device request to the master nodes 1120 including a list of full or partial identifiers (such as MAC addresses) of master nodes 1120 that have already provided their Bloom filters 600 (FIG. 6). In some embodiments, the indication of devices can itself be a Bloom filter indicating devices from which the transmitting device has received an indication of discovered devices.

In various embodiments, the request for discovered devices can include a hop count of devices that should respond to the request. The hop count can be a maximum, minimum, or exact hop count. For example, the anchor node 1110 can transmit a discovered device request indicating a hop count of one. Accordingly, only master nodes 1120 one hop away are configured to respond with an indication of discovered devices (such as the Bloom filter 600 of FIG. 6). In some embodiments, nodes can selectively respond to requests for discovered devices based on the hop count included in the request. For example, one particular device can respond only to requests from devices having a higher hop count than the hop count of the particular device.

In some embodiments, each master node 1120 and/or the anchor node 1110 can estimate a cluster size as described herein, such as with respect to FIG. 5. Each master node 1120 and/or the anchor node 1110 can transmit the cluster size estimate or indication thereof via an anchor information attribute, as discussed below with respect to FIG. 12. In an embodiment, the cluster size estimate or indication thereof can be included in discovery beacons transmitted in an interval between discovery windows.

Thus, in one example, each master node 1120 can generate a Bloom filter 600 (FIG. 6) indicative of discovered devices. The anchor node 1110 can request the Bloom filters from each master node 1120, and can merge the Bloom filters with its own, for example via a bitwise OR operation. In some embodiments, the master nodes 1120 can receive Bloom filters from child nodes, merge the received Bloom filters with their own local Bloom filters, and pass on the merged Bloom filter to a parent node, thereby propagating the a Bloom filter for the entire NAN to the anchor node 1110. The anchor node 1110 can estimate a network size and transmit the estimate in its beacon. Master nodes 1120 can receive the beacon from a parent node and can retransmit the estimated network size in their own beacons, thereby propagating the estimated network size throughout the NAN.

In various embodiments, each master node 1120 and/or the anchor node 1110 can transmit a Bloom filter 600 (FIG. 6) indicating discovered device identifiers, for example in response to a discovered device request, intermittently, periodically, randomly, and/or pseudorandomly.

Figure 12:
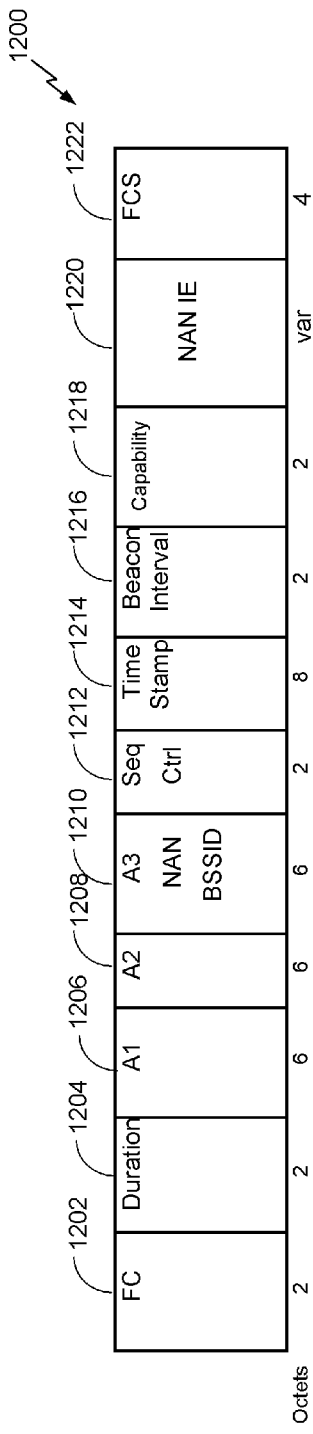
FIG. 12 shows an exemplary structure of a media access control (MAC) frame.

FIG. 12 shows an exemplary structure of a media access control (MAC) frame 1200. In some aspects, the media access control frame (MAC) 1200 can be utilized for a beacon signal discussed above. As shown, the MAC frame 1200 includes 11 different fields frame control (FC) field 1202 a duration/identification (dur) field 1204, a receiver address (A1) field 1206, a transmitter address (A2) field 1208, a destination address (A3) field 1210, which in some aspects can indicate a NAN BSSID or cluster ID, a sequence control (sc) field 1212, a timestamp field 1214, a beacon interval field 1216, a capability field 1218, an information element 1220, which can include discovery window information, and a frame check sequence (FCS) field 1222. The fields 1202-1222 include a MAC header in some aspects. Each field can include one or more sub-fields or fields. For example, frame control field 1202 of media access control header 1200 can include multiple subfields, such as a protocol version, type field, subtype field, and other fields. Moreover, a person having ordinary skill in the art will appreciate that the various fields described herein can be rearranged, resized, some fields can be omitted, and additional fields can be added.

In some aspects, the NAN BSSID field 1210 can indicate a cluster of NAN devices. In another embodiment, each NAN can have a different (for example, pseudorandom) NAN BSSID 1210. In an embodiment, the NAN BSSID 1210 can be based on a service application. For example, a NAN created by Application A can have a BSSID 1210 based on an identifier of Application A. In some embodiments, the NAN BSSID 1210 can be defined by a standards-body. In some embodiments, the NAN BSSID 1210 can be based on other contextual information and/or device characteristics such as, for example, a device location, a server-assigned ID, etc. In one example, the NAN BSSID 1210 can include a hash of the latitude and longitude location of the NAN. The NAN BSSID field 1210 shown is six octets long. In some implementations, NAN BSSID field 1210 can be four, five, or eight octets long. In some embodiments, the AP 104 can indicate the NAN BSSID 1210 in an information element.

In various embodiments, the frame 1200, or another discovery frame, can include an anchor information attribute and/or a service discovery attribute such as the service discovery attribute 1300 described below with respect to FIG. 13. In an embodiment, the NAN IE field 1220 can include field 1202 can include the anchor information attribute and/or service discovery attribute. In an embodiment, the anchor information attribute can include an indication of cluster size or cluster size estimate. In an embodiment, the anchor information attribute can be included in discovery beacons sent in an interval between discovery windows. In an embodiment, the anchor information attribute can be transmitted by one or more nodes 1110-1130 (FIG. 11) unsolicited, for example periodically, intermittently, and/or randomly or pseudorandomly.

Figure 13:
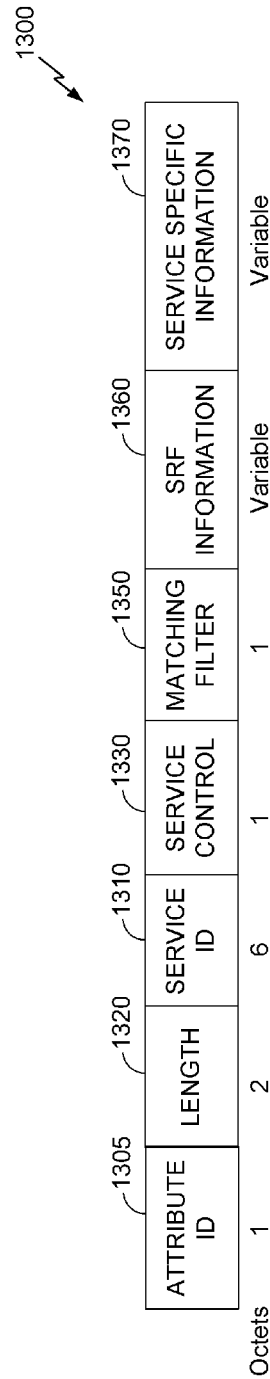
FIG. 13 shows an exemplary service discovery attribute that can be employed within the wireless communication system of FIG. 11.

FIG. 13 shows an exemplary service discovery attribute 1300 that can be employed within the wireless communication system 1100 of FIG. 11. In various embodiments, any device described herein, or another compatible device, can transmit the service discovery attribute 1300 such as, for example, any node 1110-1130 (FIG. 11), any mobile device 112-118, 122-128, and 132-142 (FIG. 1), and/or the wireless device 202 (FIG. 2). One or more messages in the wireless communication system 100 (FIG. 1) and/or the wireless communication system 1100 (FIG. 11) can include the service discovery attribute 1300 such as, for example, the NAN beacon 1200 (FIG. 12), a discovery frame, a probe response, and/or a discovery query frame. In one embodiment, a service discovery frame can include a public action frame containing one or more service discovery attributes 1300. As another example, the service discovery attribute 1300 can be in a vendor-specific IE. One or more fields of the service discovery attribute 1300 can be included in an attribute of an information element, in addition to, or instead of the service discovery attribute 1300.

In the illustrated embodiment, the service discovery attribute 1300 includes an attribute identifier 1305, a length field 1320, a service identifier 1310, a service control field 1330, a matching filter container 1350, a service response filter (SRF) information container 1360, and a service specific information container 1370. A person having ordinary skill in the art will appreciate that the service discovery attribute 1300 can include additional fields, and fields can be rearranged, removed, and/or resized. For example, in various embodiments, the service discovery attribute 1300 can omit the matching filter container 1350 and/or the matching filter container 1350, and additional length fields can be included.

The service identifier field 1310 shown is six octets long. In some implementations, the service identifier field 1310 can be two, five, or twelve octets long. In some implementations, the service identifier field 1310 can be of variable length, such as varying length from signal to signal and/or as between service providers. The service identifier field 1310 can include a value which identifies a service or application of a discovery frame. For example, the service identifier 1310 can include a hash of a service name or other value based on a service. In some embodiments, a predetermined token value can be reserved. For example, service identifiers of all-zeros or all-ones can indicate NAN management operations.

The length field 1320 can be used to indicate the length of the service discovery attribute 1300 or the total length of subsequent fields. The length field 1320 shown in FIG. 13 is two octets long. In some implementations, the length field 1320 can be one, five, or twelve octets long. In some implementations, the length field 1320 can be of variable length, such as varying length from signal to signal and/or as between service providers. In some embodiments, a length of zero (or another predetermined token value) can indicate that one or more other fields (such as the service control field 1330, the matching filter container 1350, the service response filter information container 1360, the service specific information container 1370, and/or the discovered addresses information container 1380) are not present.

The service control field 1330 can indicate information of an applicable service. The service control field 1330 shown in FIG. 13 is one octet long. In some implementations, the service control field 1330 can be two, six, or eight octets long. In some implementations, the service control field 1330 can be of variable length, such as varying length from signal to signal and/or as between service providers. In an embodiment, the service control field 1330 can include a publish flag, a subscribe flag, a range limited flag, a matching filter flag, a service information flag, an AP flag, a discovered addresses flag, and a reserved bit. In an embodiment, the service control field 1330 can include an indication that the frame includes a Bloom filter indicative of discovered devices. In an embodiment, the subscribe flag, when set, can indicate a request for a receiving device to send its Bloom filter 600 (FIG. 6). In an embodiment, the publish flag, when set, can indicate that a response frame including the Bloom filter 600 (FIG. 6). A person having ordinary skill in the art will appreciate that the service control field 1330 can include additional fields, and fields can be rearranged, removed, and/or resized.

The matching filter container 1350 can indicate matching filter information. The matching filter container 1350 shown in FIG. 13 is a variable length. In some implementations, the matching filter container 1350 can be two, six, or eight octets long. The matching filter container 1350 can include a matching filter length field and/or a matching filter for the NAN. The matching filter length field can indicate the length of the matching filter. The matching filter length field can be one octet long. In an embodiment, the matching filter length can be zero (or another predetermined token value) and the matching filter can be omitted. The matching filter can be a variable length. A person having ordinary skill in the art will appreciate that the matching filter container 1350 can include additional fields, and fields can be rearranged, removed, and/or resized.

The service response filter information container 1360 can indicate whether devices should respond to a query. In some embodiments, the service response filter information container 1360 can include a service response filter and a service response filter length field. The service response filter can include, for example, a list of partial and/or full device identifiers (for example, MAC addresses) of devices that should not respond. In an embodiment, the service response filter can include a Bloom filter indicating a list of identifiers (for example, MAC addresses) of devices that should not respond. The service response filter information container 1360 shown in FIG. 13 is a variable length. In some implementations, service response filter information container 1360 can be two, six, or eight octets long.

The service-specific information container 1370 can encapsulate one or more additional data fields related to an applicable service. The service-specific information container 1370 shown in FIG. 13 is a variable length. In some implementations, the service-specific information container 1370 can be one, five, or twelve octets long. The service-specific information container 1370 can include a service-specific information length field and/or a service-specific information field. The service-specific information length field can indicate the length of the service-specific information field. In an embodiment, the service-specific information length field can be zero (or another predetermined token value) and the service-specific information field can be omitted. The service-specific information field can be a variable length. In some implementations, the service-specific information field can be one, five, or twelve octets long.

In some embodiments, the service-specific information field can include a discovered addresses information container. The discovered addresses information container can indicate one or more addresses of devices that have been discovered by the transmitting device 202 (FIG. 2). For example, the discovered addresses information container can include the Bloom filter 600 (FIG. 6). The discovered addresses information can be a variable length. In some implementations, the discovered addresses information container can be one, five, or twelve octets long.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless device configured to monitor a number of a plurality of neighboring wireless devices in a wireless network, the wireless device comprising:
   a receiver configured to receive a message from a first neighboring wireless device of the plurality of neighboring wireless devices, the message comprising an identifier associated with the first neighboring wireless device; and
   a processor configured to:
      utilize a Bloom filter comprising m bits and m counters, each of the m counters being associated with a different bit of the m bits, each of the m counters having a value between zero and a maximum value,
      add the identifier associated with the first neighboring wireless device into the Bloom filter,
      reduce the value of each of the m counters that have a non-zero value by one, for every time interval of a duration T, when the value of one of the m counters is reduced to zero, set an associated bit of the m bits to zero, and estimate a number of distinct strings that are present in the Bloom filter based on a number of zeros in the Bloom filter or a number of ones in the Bloom filter, the number of distinct strings representing an estimate of the number of the plurality of neighboring wireless devices in the wireless network.

2. The wireless device of claim 1, wherein the wireless device comprises an anchor device configured to transmit a beacon comprising the estimate of the number of the plurality of neighboring wireless devices in the wireless network for successive propagation throughout the wireless network.

3. The wireless device of claim 1, wherein the processor is further configured to, when any one bit of the m bits is set to 1, set the value of a counter associated with the one bit to the maximum value.

4. The wireless device of claim 1, wherein k different hash functions are associated with the Bloom filter, and wherein each of the k hash functions map an input string to one of the m bits array positions with a uniform random distribution.

5. The wireless device of claim 4, wherein the number of distinct strings is estimated by the following formula:

$$N_{distinct} = \frac{m}{k} * \log\left(\frac{N_0}{m}\right),$$

wherein $N_{distinct}$ is the number of distinct strings, and wherein $N_0$ is the number of zeros in the may Bloom filter.

6. The wireless device of claim 4, wherein the Bloom filter is designed to track up to N devices, and the parameter m of the Bloom filter has a value being approximately N.

7. The wireless device of claim 4, wherein at least one of the k hash functions is a cyclic redundancy check of an input string.

8. The wireless device of claim 4, wherein at least one of the k hash functions is created using a first hash function which maps an input string to an integer between 0 and p–1, wherein the at least one hash function includes using the first hash function to map an input string to an integer between 0 and p–1, and then applying a modulus operation to find the remainder of division of the integer by in, the remainder being the value returned by the at least one hash function.

9. The wireless device of claim 8, wherein the first hash function selects a plurality of bits from the input string and arranges the bits in a sequence according to a pattern, the sequence of bits representing an integer being the value returned by the first hash function.

10. The wireless device of claim 1, wherein the identifier associated with the first neighboring wireless device is one of the following: a MAC address, a service identifier, or an application-based identifier.

11. The wireless device of claim 1, wherein the processor is further configured to request the Bloom filter from at least one of the plurality of neighboring wireless devices in the wireless network.

12. The wireless device of claim 11, wherein the processor is further configured to send a service discovery frame, comprising a set subscribe bit, to the at least one of the plurality of neighboring wireless devices to request the Bloom filter.

13. The wireless device of claim 12, wherein the service discovery frame comprises at least one of an indication of neighboring wireless devices from which a Bloom filter has already been received and an indication of a hop count for which neighboring devices should respond.

14. The wireless device of claim 12, wherein the first wireless device comprises at least one of an anchor node or a master node.

15. The wireless device of claim 11, wherein the processor is further configured to generate the Bloom filter for the at least one of the plurality of neighboring wireless devices by storing a bitwise OR of a plurality of Bloom filters received from at least a portion of the plurality of neighboring wireless devices.

16. The wireless device of claim 1, wherein the processor is further configured to reset one or more of the m bits to zeros at random intervals of time, the one or more of the m bits being randomly picked, and wherein the processor is further configured to choose a number of them bits to be reset and a distribution of the random intervals based on one or more of the following:

the number of the plurality of neighboring wireless devices in the wireless network, an estimated rate at which the plurality of neighboring wireless devices leave the wireless network, and one or more time intervals at which the plurality of neighboring wireless devices change their MAC addresses.

17. A method of monitoring a number of a plurality of neighboring wireless devices in a wireless network, the method comprising:

receiving a message from a first neighboring wireless device of the plurality of neighboring wireless devices, the message comprising an identifier associated with the first neighboring wireless device;

utilizing a Bloom filter comprising m bits and m counters, each of the m counters being associated with a different bit of the m bits, each of the m counters having a value between zero and a maximum value;

adding the identifier associated with the first neighboring wireless device into the Bloom filter;

reducing the value of each of the m counters that have a non-zero value by one, for every time interval of a duration T;

when the value of one of the m counters is reduced to zero, setting an associated bit of the m bits to zero; and estimating a number of distinct strings that are present in the Bloom filter based on a number of zeros in the Bloom filter or a number of ones in the Bloom filter, the number of distinct strings representing an estimate of the number of the plurality of neighboring wireless devices in the wireless network.

18. The method of claim 17, the method further comprising, when any one bit of the m bits is set to 1, setting the value of a counter associated with the one bit to the maximum value.

19. The method of claim 17, wherein k different hash functions are associated with the bit Bloom filter, and wherein each of the k hash functions map an input string to one of the m bits with a uniform random distribution.

20. The method of claim 19, wherein at least one of the k hash functions is a cyclic redundancy check of an input string.

21. The method of claim 19, wherein the k hash functions are realized using a single hash function and k different supplemental strings, wherein adding the identifier associated with the first neighboring wireless device to the Bloom filter comprises:

generating k amended strings based on, the identifier associated with the first neighboring wireless device and the k different supplemental strings; and generating k array positions based on the k amended strings and the single hash function.

22. The method of claim 19, wherein the parameter k of the Bloom filer has a value of 1, and the parameter m of the Bloom filter has a value being about substantially twice a maximum size of the wireless network.

23. The method of claim 17, wherein the identifier associated with the first neighboring wireless device is one of the following: a MAC address, a service identifier, or an application-based identifier.

24. The method of claim 17, the method further comprising:
upon joining the wireless network, requesting a current Bloom filter from at least one of the plurality of neighboring wireless devices in the wireless network; and
receiving a message from one of the at least one of the plurality of neighboring wireless devices, the message including the current Bloom filter and a time at which the current Bloom filter of the neighboring wireless device was started.

25. The method of claim 24, the method further comprising generating the Bloom filter for the at least one of the plurality of neighboring wireless devices by storing a bitwise OR of a plurality of Bloom filters received from at least a portion of the plurality of neighboring wireless devices.

26. The method of claim 17, further comprising;
requesting a second Bloom filter from at least a first second neighboring wireless device; and
estimating a shared number of the plurality of neighboring wireless devices which the wireless device and the second neighboring wireless device have in common based on a combined Bloom filter, the combined Bloom filter being generated by performing a bitwise AND of the Bloom filter utilized by the wireless device and the second Bloom filter.

27. A wireless device for monitoring a number of a plurality of neighboring wireless devices in a wireless network, the device comprising:
means for receiving a message from a first neighboring wireless device of the plurality of neighboring wireless devices, the message comprising an identifier associated with the first neighboring wireless device;
means for utilizing a Bloom filter comprising m bits and m counters, each of the m counters being associated with a different bit of the m bits, each of the m counters having a value between zero and a maximum value;
means for adding the identifier associated with the first neighboring wireless device into the Bloom filter;
means for reducing the value of each of the m counters that have a non-zero value by one, for every time interval of a duration T;
means for, when the value of one of the m counters is reduced to zero, setting an associated bit of the m bits to zero; and
means for estimating a number of distinct strings that are present in the Bloom filter based on a number of zeros in the Bloom filter or a number of ones in the Bloom filter, the number of distinct strings representing an estimate of the number of the plurality of neighboring wireless devices in the wireless network.

28. A non-transitory physical computer storage comprising computer executable instructions configured to implement a method for monitoring a number of a plurality of neighboring wireless devices in a wireless network, the method comprising:
receiving a message from a first neighboring wireless device of the plurality of neighboring wireless devices, the message comprising an identifier associated with the first neighboring wireless device;
utilizing a Bloom filter comprising m bits and m counters, each of the m counters being associated with a different bit of the m bits, each of the m counters having a value between zero and a maximum value;
adding the identifier associated with the first neighboring wireless device into the Bloom filter;
reducing the value of each of the m counters that have a non-zero value by one, for every time interval of a duration T;
when the value of one of the m counters is reduced to zero, setting an associated bit of the m bits to zero; and
estimating a number of distinct strings that are present in the Bloom filter based on a number of zeros in the Bloom filter or a number of ones in the Bloom filter, the number of distinct strings representing an estimate of the number of the plurality of neighboring wireless devices in the wireless network.

* * * * *